United States Patent
Deng et al.

(10) Patent No.: US 12,237,719 B2
(45) Date of Patent: Feb. 25, 2025

(54) ELECTRIC MACHINE STATOR AND METHOD FOR REDUCING TORQUE RIPPLE OF ELECTRIC MACHINE

(71) Applicant: FORD GLOBAL TECHNOLOGIES, LLC, Dearborn, MI (US)

(72) Inventors: Chuan Deng, Nanjing (CN); Yigang Yuan, Nanjing (CN); Guohua Du, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 396 days.

(21) Appl. No.: 17/687,978

(22) Filed: Mar. 7, 2022

(65) Prior Publication Data
US 2022/0294284 A1   Sep. 15, 2022

(30) Foreign Application Priority Data
Mar. 9, 2021   (CN) .......................... 202110255152.6

(51) Int. Cl.
| | | |
|---|---|---|
| *H02K 1/16* | (2006.01) | |
| *H02K 3/12* | (2006.01) | |
| *H02K 3/48* | (2006.01) | |
| *H02K 15/02* | (2006.01) | |

(52) U.S. Cl.
CPC ............ *H02K 1/165* (2013.01); *H02K 15/024* (2013.01); *H02K 3/12* (2013.01); *H02K 3/48* (2013.01); *H02K 2213/03* (2013.01)

(58) Field of Classification Search
CPC ........ H02K 1/165; H02K 15/024; H02K 3/12; H02K 3/48; H02K 2213/03; H02K 21/14; H02K 29/03; H02K 3/16
See application file for complete search history.

(56) References Cited

U.S. PATENT DOCUMENTS

| | | | | |
|---|---|---|---|---|
| 1,541,656 A | * | 6/1925 | Parsons | H02K 3/12 310/195 |
| 2,267,414 A | * | 12/1941 | Morrill | H02K 1/165 310/216.004 |
| 3,062,978 A | * | 11/1962 | Smith | H02K 17/04 310/216.071 |
| 9,564,779 B2 | | 2/2017 | Nakano et al. | |

(Continued)

FOREIGN PATENT DOCUMENTS

| | | |
|---|---|---|
| CN | 102122852 A | 7/2011 |
| CN | 203014512 U | 6/2013 |

(Continued)

*Primary Examiner* — Ahmed Elnakib
(74) *Attorney, Agent, or Firm* — Brooks Kushman PC; David B. Kelley

(57) ABSTRACT

A stator for an electric machine includes slots for accommodating windings, the slots having a slot neck portion and a filling portion and extending radially between an inner circumference and an outer circumference of the stator, and including regular slots and misplaced slots. The slot neck portion of the misplaced slots has a dimension different from that of the regular slots. The plurality of slots and windings establish a plurality of phases, each phase occupying at least two adjacent slots, and the at least two adjacent slots include a regular slot and a misplaced slot resulting in reduced torque ripple and an associated reduction in vehicle NVH.

19 Claims, 4 Drawing Sheets

(56) References Cited

U.S. PATENT DOCUMENTS

| | | | |
|---|---|---|---|
| 2005/0099086 A1* | 5/2005 | Schunk | H02K 1/165 |
| | | | 310/216.069 |
| 2008/0024028 A1 | 1/2008 | Islam et al. | |
| 2011/0037339 A1 | 2/2011 | Rahman et al. | |
| 2012/0228981 A1* | 9/2012 | Dajaku | H02K 3/28 |
| | | | 310/195 |
| 2014/0252905 A1* | 9/2014 | Manfe | H02K 19/12 |
| | | | 310/162 |
| 2019/0165623 A1 | 5/2019 | Yen et al. | |
| 2022/0052586 A1* | 2/2022 | Nagase | H02K 11/25 |
| 2022/0181937 A1* | 6/2022 | Deng | H02K 1/165 |
| 2022/0294284 A1* | 9/2022 | Deng | H02K 1/165 |

FOREIGN PATENT DOCUMENTS

| | | |
|---|---|---|
| CN | 208423957 U | 1/2019 |
| CN | 107947398 B | 7/2022 |

* cited by examiner

ELECTRIC MACHINE STATOR AND METHOD FOR REDUCING TORQUE RIPPLE OF ELECTRIC MACHINE

CROSS-REFERENCE TO RELATED APPLICATIONS

This application claims foreign priority benefits under 35 U.S.C. § 119(a)-(d) to CN Application 2021 102 551 526 filed Mar. 9, 2021, which is hereby incorporated by reference in its entirety.

TECHNICAL FIELD

The present disclosure relates to a stator for an electric machine, an electric machine using the stator, and a method for reducing torque ripple of the electric machine.

BACKGROUND

Electric vehicles are rapidly evolving in the design and manufacture of modern vehicles, such as battery electric vehicles (BEVs), plug-in electric vehicles (PHEVs), and hybrid electric vehicles (HEVs), which all include electric machines for driving the wheels.

The electric machine relies on the cooperation of a stator and a rotor to convert electrical energy into mechanical motion, or convert the mechanical motion into the electrical energy. The electric machine typically includes a rotor and a stator surrounding the rotor. The stator has a plurality of slots that have a certain cross-sectional area to accommodate windings with a consistent cross-sectional area. The stator windings after energization form a rotating magnetic field and interact with magnets contained in the rotor to rotate the rotor. Torque ripple is an important measurement parameter for the electric machine design.

Currently, reducing the torque ripple of the electric machine can usually be done on the stator and the rotor. From the rotor, a magnet deflection and an optimization of the rotor outer rim are conventional methods used to reduce the torque ripple of the electric machine. And for the stator, a stator chute is effective to reduce the target torque ripple, but the stator chute will increase the complexity of the windings. Another conventional method is to use all open slot structures to reduce torque ripple, but the inventors have realized that the effect can be also improved or optimized.

For example, in the Chinese patent application with an application number of 2011320011997.1, titled "a permanent magnet engine with a stator chute", a stator core with a large angle chute is provided to reduce the torque ripple of the electric machine, but the arrangement of the large angle chute in this technical scheme will increase the complexity of the windings in the chute.

Against the above background, the inventors have realized that there is a need for an improved electric machine that can reduce the torque ripple and improve the vehicle NVH performance.

SUMMARY

One advantage of embodiments according to the present disclosure is that it provides a stator for an electric machine, an electric machine using the stator, and a method for reducing torque ripple of the electric machine. The electric machine and the method can effectively reduce the torque ripple of the electric machine (especially the 24th-order and the 48th-order) thereby improving the NVH performance of the vehicle.

A stator for an electric machine according to one or more embodiments includes a plurality of slots for accommodating the windings, wherein the slots extend radially between the inner and outer circumferences of the stator. The slots include regular slots and misplaced slots, wherein the regular slots include a first slot neck portion and a first filling portion, and the misplaced slots include a second slot neck portion and a second filling portion. The first slot neck portion and the second slot neck portion have different dimensions, and the plurality of slots and the plurality of windings establish at least two phases, wherein at least one of the at least two phases includes the regular slot and the misplaced slot. The at least two phases may include a U-phase, V-phase, and W-phase. The U-phase, the V-phase, and the W-phase sequentially occupy the plurality of slots of the stator, and the U-phase, the V-phase, and the W-phase each include one regular slot and one misplaced slot. The regular slot and the misplaced slot may be arranged alternately in sequence. The regular slot and the misplaced slot may be arranged in the following order: the U-phase regular slot, the U-phase misplaced slot, the V-phase regular slot, the V-phase misplaced slot, the W-phase misplaced slot, and the W-phase regular slot. The misplaced slot and the regular slot may be arranged in sequence in the U-phase and the V-phase, and in the W-phase, the regular slot and the misplaced slot may be arranged in sequence.

In various embodiments each of the at least two phases occupies three slots, the ratio of the number of the regular slots to the number of the misplaced slots in the three slots is 2:1 or 1:2. The different dimension may be the length of the slot neck portion extending in a radial direction and/or width in a circumferential direction of the stator. The first filling portion and the second filling portion may have the same width and radial length, wherein the first slot neck portion has a width and a radial length smaller than those of the second slot neck portion.

In one or more embodiments, the second slot neck portion has a first width in a circumferential direction of the inner circumference of the stator, the second filling portion has a second width in the circumferential direction of the inner circumference of the stator, and the first width is smaller than the second width. The first filling portion may have a first inner end portion adjacent to the inner circumference and a first outer end portion adjacent to the outer circumference, the first inner end portion and the first outer end portion are respectively located on concentric circles having a first radius and a second radius from a center of the stator.

In some embodiments, the second filling portion has a second inner end portion adjacent to the inner circumference and a second outer end portion adjacent to the outer circumference, the second inner end portion and the second outer end portion are respectively located on concentric circles having a third radius and a fourth radius from the center of the stator, and the first radius, the second radius, the third radius, and the fourth radius are all different.

Embodiments may also include an electric machine having a stator surrounding a rotor with an air gap therebetween, wherein the stator has a plurality of slots for accommodating windings, the plurality of slots each have a slot neck portion and a filling portion and extend radially between the inner and outer circumferences of the stator, the plurality of slots include regular slots and misplaced slots, and the slot neck portion of the misplaced slot has a dimension different from that of the regular slot, and the plurality of slots and the plurality of windings establish a plurality of phases, wherein each of the plurality of phases occupies at least two slots, the two slots include the regular slot and the misplaced slot.

In one or more embodiments, the plurality of slots and windings establish eight poles and three phases. The three phases are U-phase, V-phase and W-phase, respectively, with each of the U-phase, the V-phase, and the W-phase comprising one regular slot and one misplaced slot. The regular slot and the misplaced slot may be arranged alternately in sequence in the U-phase, the V-phase, and the W-phase. The dimension of the slot neck portion may be the length of the slot neck portion extending in a radial direction and/or width in a circumferential direction of the stator.

In some embodiments, the regular slot includes a first filling portion and a first slot neck portion, the misplaced slot includes a second filling portion and a second slot neck portion, the first filling portion has a first inner end portion adjacent to the inner circumference and a first outer end portion adjacent to the outer circumference, the second filling portion has a second inner end portion adjacent to the inner circumference and a second outer end portion adjacent to the outer circumference, the first inner end portion and the first outer end portion are respectively located on concentric circles having a first radius and a second radius from a center of the stator, the second inner end portion and the second outer end portion are respectively located on concentric circles having a third radius and a fourth radius from the center of the stator, and the first radius, the second radius, the third radius, and the fourth radius are all different. The second slot neck portion may have a first width in a circumferential direction of the inner circumference of the stator, the second filling portion may have a second width in the circumferential direction of the inner circumference of the stator, and the first width is smaller than the second width.

Embodiments according to the present disclosure may include a method for reducing torque ripple for an electric machine that includes providing a stator with an inner circumference adapted to surround a rotor, disposing a plurality of stator slots for accommodating windings radially between the inner and outer circumferences of the stator, the plurality of stator slots each have a slot neck portion and a filling portion, the stator slots include regular slots and misplaced slots, the slot neck portion of the misplaced slot has a length different from that of the regular slot, establishing a plurality of phases through the plurality of stator slots and a plurality of windings, and making each of the plurality of phases occupy at least two slots, the at least two slots comprising the regular slot and the misplaced slot. The plurality of phases may be a U-phase, V-phase and W-phase, each including one regular slot and one misplaced slot arranged alternately in sequence.

In one or more embodiments, the regular slot includes a first filling portion and a first slot neck portion, the misplaced slot includes a second filling portion and a second slot neck portion, the first filling portion has a first inner end portion adjacent to the inner circumference and a first outer end portion adjacent to the outer circumference, the second filling portion has a second inner end portion adjacent to the inner circumference and a second outer end portion adjacent to the outer circumference, the first inner end portion and the first outer end portion are respectively located on concentric circles having a first radius and a second radius from a center of the stator, the second inner end portion and the second outer end portion are respectively located on concentric circles having a third radius and a fourth radius from the center of the stator, and the first radius, the second radius, the third radius, and the fourth radius are all different.

For a better understanding of the present disclosure, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further in the figures, like referenced numerals refer to like parts throughout the different figures.

DETAILED DESCRIPTION

The embodiments of the present disclosure are described below. However, it should be understood that the disclosed embodiments are merely examples, and other embodiments may take various alternative forms. The drawings are not necessarily drawn to scale; some functions may be exaggerated or minimized to show details of specific components. Therefore, the specific structural and functional details disclosed herein should not be construed as restrictive, but merely serve as a representative basis for teaching those skilled in the art to use the present disclosure in various ways. As those of ordinary skill in the art will understand, the various features shown and described with reference to any drawing can be combined with the features shown in one or more other drawings to produce embodiments that are not explicitly shown or described. The combinations of features shown provide representative embodiments for typical applications. However, various combinations and modifications to features consistent with the teachings of the present disclosure may be desirable for certain specific applications or implementations.

As mentioned in the background, the torque ripple of the electric machine is one of the important parameters in the electric machine design. The inventors of the present application have realized that the noise, vibration and harshness (NVH) performance of vehicle transmissions is very sensitive to high-order (especially 24th-order and 48th-order) torque ripple harmonics of the electric machine. As such, reducing the torque ripple of the electric machine, especially the 24th-order and 48th-order torque ripple harmonics of the electric machine may reduce vehicle NVH and optimize performance of the electric machine.

Figure 1A:
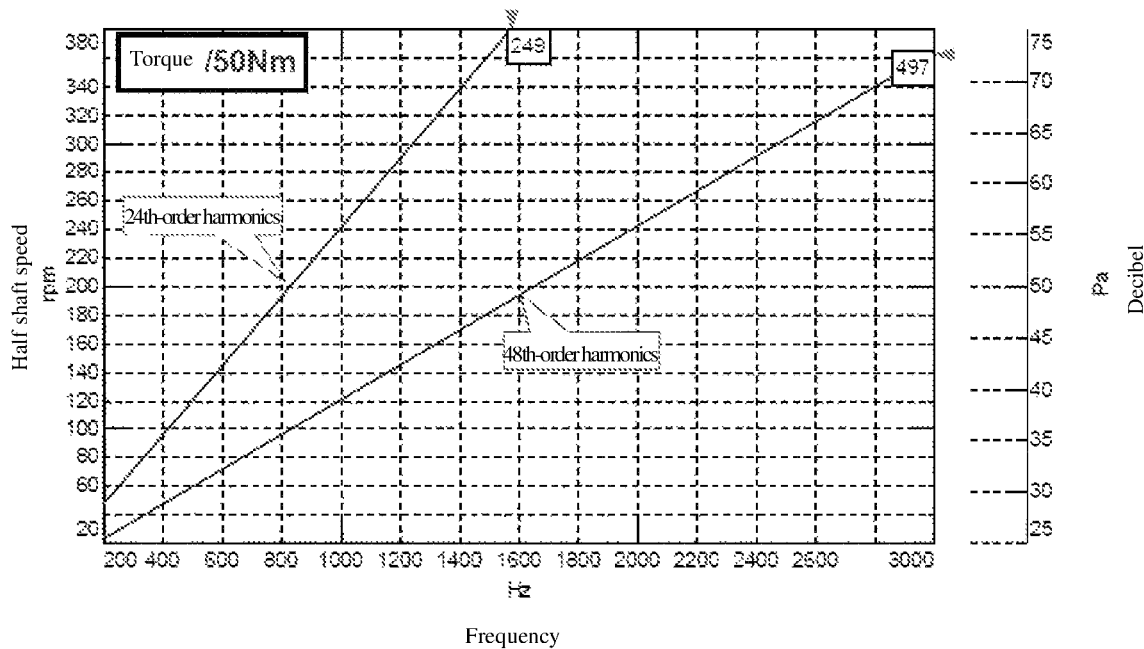
FIGS. 1A and 1B show a schematic diagram of transmission noise caused by the 24th-order and 48th-order torque ripple harmonics of prior art electric machines with different torques in the prior art.
Figure 1B:
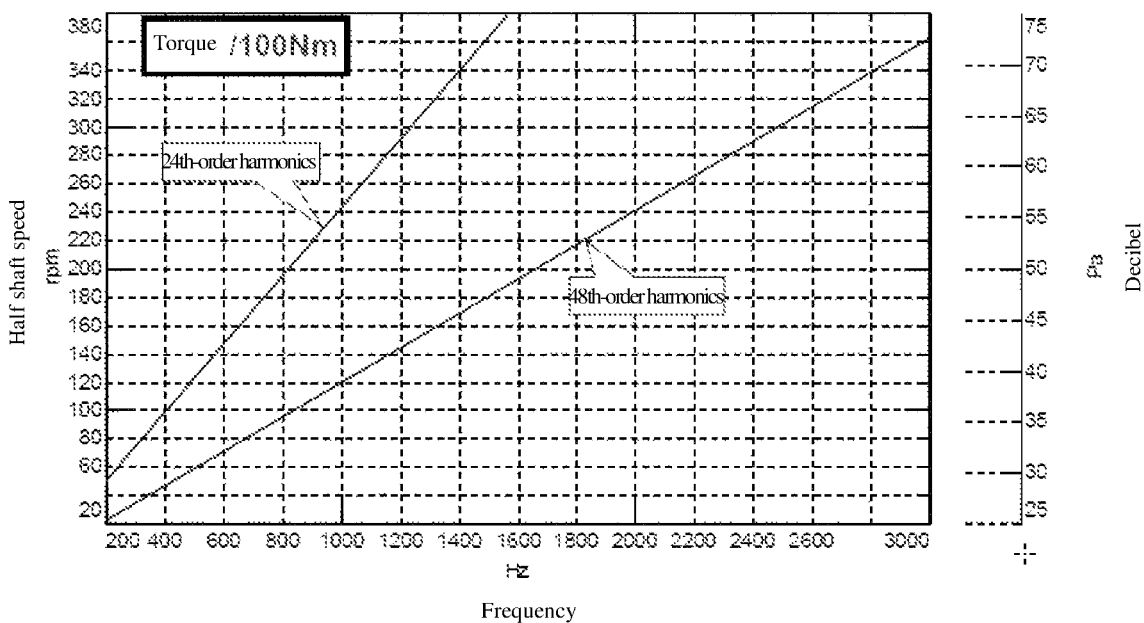

As shown in FIGS. 1A and 1B, the inventors have obtained a schematic diagram of the vehicle noise caused by the 24th-order torque ripple harmonics and the 48th-order torque ripple harmonics of a prior art electric machine through experiments. FIG. 1A is a function diagram of the 24th-order and 48th-order torque ripple harmonics of the electric machine with a torque of 50 Nm in a coordinate system of the half shaft speed/frequency/decibel. Wherein the half shaft speed is a speed of the transmission output shaft measured by a speed sensor. It can be seen that as the speed increases, the corresponding frequency of the 24th-order and 48th-order torque ripple harmonics of the electric machine and the resulting noise decibels are also higher, that is, they are positively correlated. The 24th-order and 48th-order torque ripple harmonics of the electric machine with a torque of 100 Nm as shown in FIG. 1B also present the same problem. The inventors thus have realized that it is necessary to reduce the torque ripple of the electric machine, especially the 24th-order and 48th-order torque ripple harmonics of the electric machine.

Figure 2:
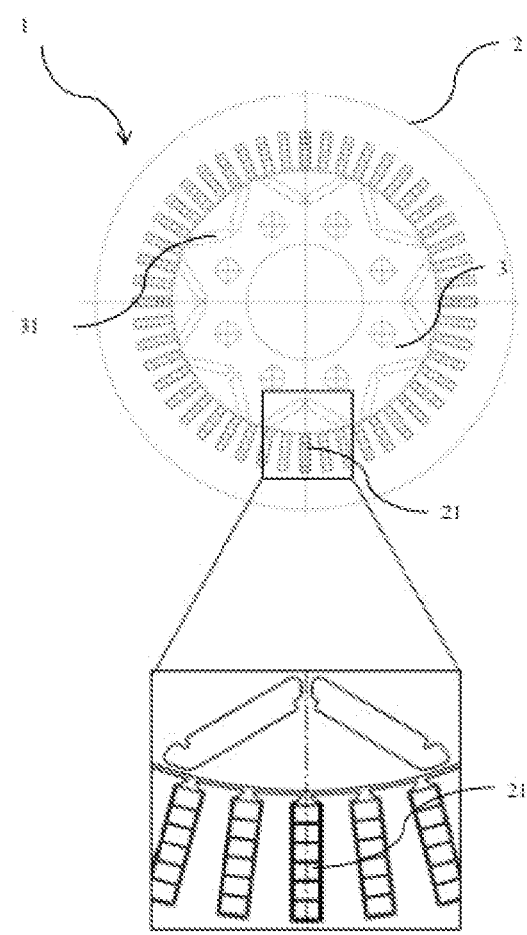
FIG. 2 shows a schematic diagram of an electric machine stator in the prior art.

Next, as shown in FIG. 2, a schematic diagram of a stator and rotor of a prior art electric machine currently in use is shown. As can be seen from FIG. 2, the electric machine includes a power component 1 which includes a stator 2 and a rotor 3. The stator 2 is arranged around the rotor 3, and there is an air gap between the stator 2 and the rotor 3. The rotor 3 may be mechanically connected to a shaft (not shown) to output mechanical energy. The stator 2 includes a plurality of slots 21 for accommodating windings. The slots 21 extend radially outward from an inner edge of the stator 2. In the stator 2 of the existing design, most of the stator slots are regular slots 21 with the same configuration. The rotor 3 may include an accommodating portion sized to accommodate permanent magnets 31. The permanent magnets 31 may be arranged in pairs to form magnetic poles. The number of slots 21 may be related to the number of pairs of permanent magnets 31 such that the number of slots 21 per pole per phase is an integer number. Among them, there is still room for improvement in the effect of reducing the torque ripple when the stator 2 adopts the arrangement of the slots 21 with the same structure.

Figure 3:
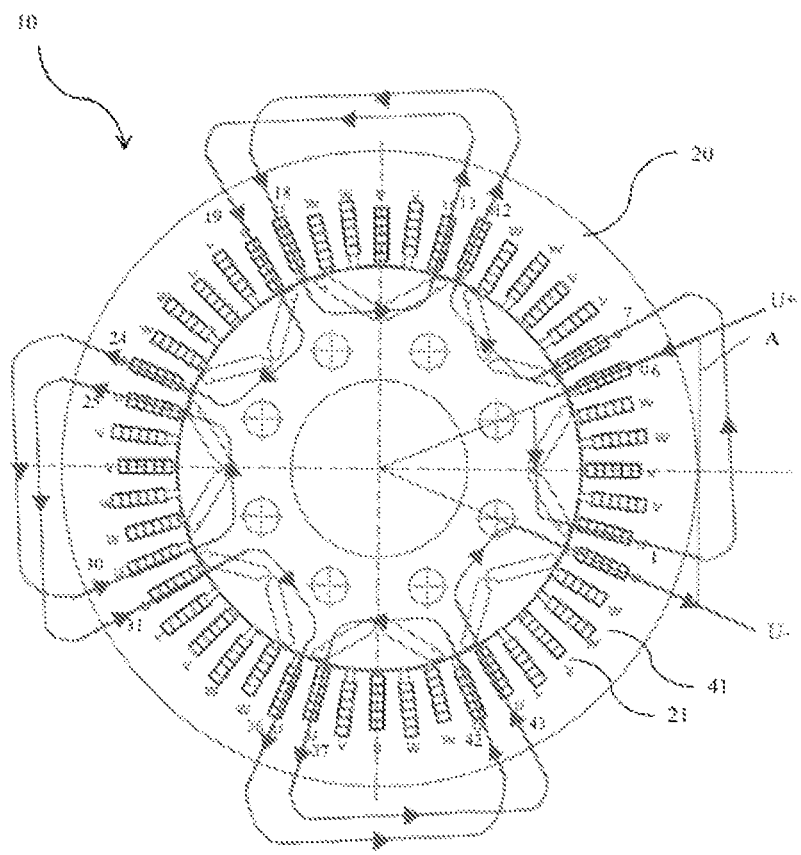
FIG. 3 shows an arrangement of the stator windings of the stator slots according to one embodiment of the present disclosure.

Next, as shown in FIG. 3, an arrangement of the stator windings of the stator slots according to one embodiment of the present disclosure is shown in FIG. 3. As shown in the figure, the electric machine in this embodiment takes a three-phase electric machine as an example, and the electric machine includes a power component 10 which includes a stator 20 and a rotor 30. The stator 20 surrounds the rotor 30 and there is an air gap therebetween. The winding mode is described by taking a U-phase winding as an example. In this embodiment, each phase occupies groups of at least two adjacent slots, and the two slots occupied include a regular slot 21 and a misplaced slot 41 as shown in FIG. 3. As shown in the figure, in this embodiment, the stator 20 of the three-phase electric machine has 48 stator slots, wherein the winding mode of the U-phase coil is shown. It should be understood that electric machines with other numbers of phases and also stators with other numbers of stator slots also fall within the scope of the technical schemes claimed in the present disclosure.

In order to describe the coil winding mode of the stator 20, in this embodiment the winding starts at terminal U+ in FIG. 3. The plurality of slots are sorted counter-clockwise in Arabic numerals. The winding first enters into slot #6 and extends to slot #1, then the winding returns through slot #1. Next, the winding extends to slot #7 and into slot #7 and then returns through slot #12, and then the winding enters into slot #18. The winding then returns through slot #13 and into slot #19. Next, the winding returns through slot #24 and into slot #30. The winding then returns through slot #25 and into slot #31. The winding then returns through slot #36 and into slot #42. The winding then returns through slot #37 and into slot #43, and finally the winding returns through slot #48. The winding then ends at terminal U-, thereby completing the winding mode of the U-phase of the three-phase electric machine. It will be appreciated that the V-phase and W-phase of the three-phase electric machine have similar entering and returning winding modes to the U-phase. The slots occupied by each phase when the three-phase winding is completed is shown in FIG. 3. Among them, the slots occupied by the U-phase, the V-phase and the W-phase are marked with U, V and W, respectively.

In order to obtain the best effect of reducing the torque ripple, on the basis of ensuring that each phase contains at least one regular slot 21 and one misplaced slot 41, the inventors have tried to use the slot arrangements as shown in Table 1 below:

|  | U | U | V | V | W | W |
|---|---|---|---|---|---|---|
| Prior Art | x | x | x | x | x | x |
| 1$^{st}$ Scheme | x | o | x | o | x | o |
| 2$^{nd}$ Scheme | x | o | o | x | x | o |
| 3$^{rd}$ Scheme | o | x | o | x | x | o |

Table 1 shows a prior art arrangement scheme with all regular slots ("x") and three different arrangements of schemes 1 to 3 according to the present disclosure with regular slots ("x") and misplaced slots ("o"). As shown in Table 1, the stator slots of the prior art electric machine stator currently in use are all set as regular slots 21. In the schemes 1 to 3 according to the present disclosure, in the U-phase, the V-phase and the W-phase, each phase includes one regular slot 21 (denoted by "x") and one misplaced slot 41 (denoted by "o"). In the embodiment shown in FIG. 3 of the present disclosure, the arrangement of scheme 1 will be used as an example to illustrate, but it should be understood that the arrangement of the other schemes also fall within the protection scope claimed in the present disclosure.

As shown in FIG. 3, taking slot 1 # to slot 6 # as an example, the arrangement of regular slots and misplaced slots is "regular-slot/misplaced-slot, regular-slot/misplaced-slot, regular-slot/misplaced-slot", which is completely done in accordance with the arrangement in above scheme 1. That is to say, the 48 slots of the stator 20 are cycled in a group of 6 slots, and are repeatedly arranged according to the arrangement of the six slots occupied by the three phases in above scheme 1.

Figure 4A:
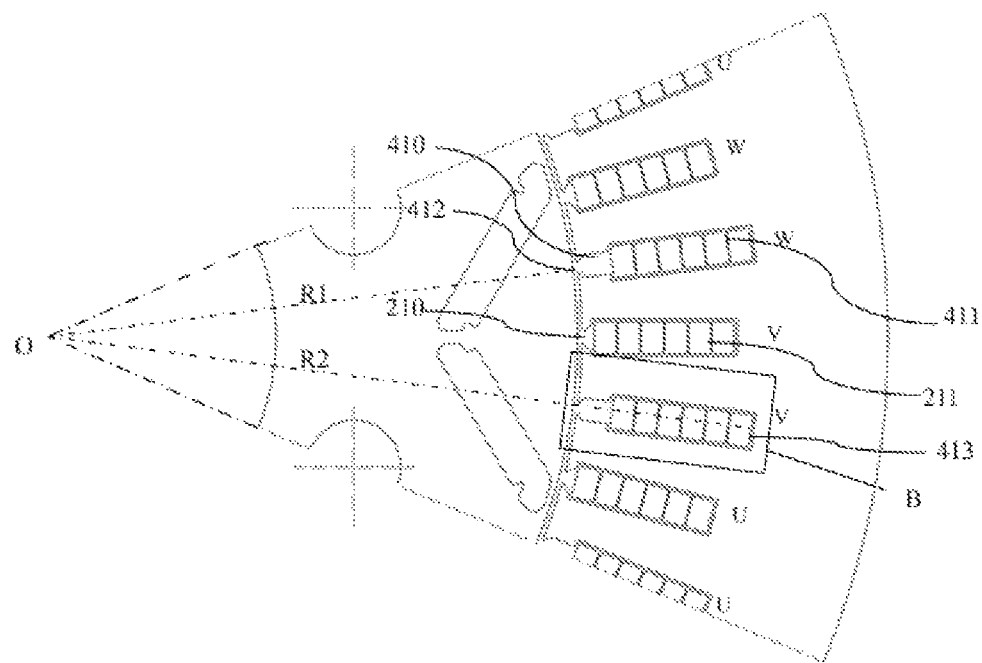
FIG. 4A shows an enlarged view of the portion taken from block A in FIG. 3.
Figure 4B:
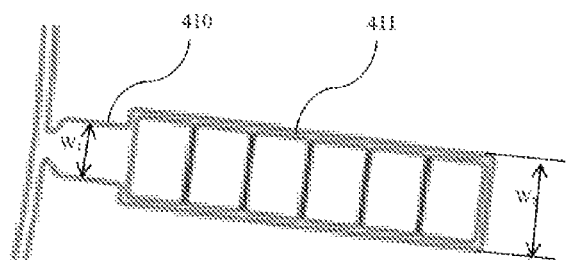
FIG. 4B shows an enlarged view of the portion taken from block B in FIG. 4A.

The embodiment shown in FIG. 4A is an enlarged view of section A in FIG. 3. In this embodiment, the structures of the regular slot 21 and the misplaced slot 41 are clearly shown, that is—the regular slot 21 having a first slot neck portion 210 and a first filling portion 211, the misplaced slots having a second slot neck portion 410 and a second filling portion 411. The first filling portion 211 and the second filling portion 411 are filled with conductors, and in this embodiment, the conductors may be winding coils. It can be understood that other conductors can also be used as fillers to be filled into the first filling portion 211 and the second filling portion 411.

In this embodiment, the first slot neck portion 210 extends in a radial direction between the first filling portion 211 and the inner circumference of the stator, and the second slot neck portion 410 extends in the radial direction between the second filling portion 411 and the inner circumference of the stator. Wherein, compared with the first slot neck portion 210 of the regular slot 21, the misplaced slot 41 has a second slot neck portion 410 with a longer length. In the present embodiment, both the regular slot 21 and the misplaced slot 41 are open slots with openings toward the air gap, and since the first filling portion 211 and the second filling portion 411 have the same length, while the first slot neck portion 210 and the second slot neck portion 410 have different lengths, overall length of the regular slot 21 and the misplaced slot 41 in the radial direction is different. It can be understood that, in another embodiment of the present disclosure, the regular slot 21 and the misplaced slot 41 can also be closed slots without openings.

Those skilled in the art can understand that there is no clear dividing line between the first slot neck portion 210 and the first filling portion 211 or between the second slot neck portion 410 and the second filling portion 411. As shown in FIG. 3B, taking the misplaced slot 41 as an example, the second slot neck portion 410 has a first width $W_1$ in the circumferential direction of the inner circumference of the stator 2, and the second filling portion 411 has a second width $W_2$ in the circumferential direction of the inner circumference of the stator 2, and the first width $W_1$ is smaller than the second width $W_2$. In other words, the width of the slot is gradually narrowed as it transitions from the filling portion to the slot neck portion. In addition, it should be understood that since the width of the second slot neck portion 410 is gradually narrowed, the first width $W_1$ of the slot neck portion in the inner circumference of the stator 2 is not a fixed value, but may be within a certain width range. The maximum value of the width range is smaller than the second width $W_2$ of the second filling portion 411.

In one embodiment of the present disclosure, when the slots in the stator 2 are all open slots, either the first slot neck portion 210 or the second slot neck portion 410 can extend from the slot opening to the first filling portion 211 or the second filling portion 411, but neither the first slot neck portion 210 nor the second slot neck portion 410 is filled with windings, however, in the case that the slots in the stator 2 are all closed slots, the first slot neck portion 210 or the second slot neck portion 410 may extend from the inside of the closed end near the inner edge of the stator 2 to the filling portion.

In one embodiment, the misplaced slot 41 has such a structure that, after the transition from the second filling portion 410 to the second slot neck portion 411, the first width $W_1$ first becomes smaller and then $W_1$ becomes wider again to provide a larger air gap. It can be understood that, in the embodiment of the present disclosure, the first width w1 transitioning from the filling portion to the slot neck portion is generally gradually become wider near the inner edge of the stator 2 in order to provide a larger air gap. It can also be understood that, the difference in the dimension between the first slot neck portion 210 and the second slot neck portion 410 not only includes the difference in the length in the radial direction, but also includes the difference in the first width $W_1$ of the two.

In the described embodiment, due to the longer second slot neck portion 410 of the misplaced slot 41, the end of the misplaced slot 41 towards the outer edge of the stator 2 is radially misplaced from the end of the regular slot 21 towards the outer edge. In other words, taking the stator axis as a reference, the end of the misplaced slot 41 towards the outer edge and the end of the regular slot 21 towards the outer edge are not on the same circumferential line of the stator cross-section.

Referring to FIG. 4A, in the present embodiment, the misplaced slot 41 has an inner end portion 412 adjacent to the inner circumference of the stator 10 and an outer end portion 413 adjacent to the outer circumference, and the inner end portion 412 and the outer end portion 413 are respectively located on the concentric circles having a first radius R1 and a second radius R2 from a center O of the stator 10—that is to say, the plurality of misplaced slots 41 have similar structures. by arranging the misplaced slots 41 with similar structures, on the basis of realizing the suppression of torque ripple, the misplaced slots 41 are more convenient to process and the stator 10 including the misplaced slots 41 is more convenient. It can be understood here that, the misplaced slots 41 can also have different structures, for example, the outer ends thereof can have different distances from the center of the stator 10 or there are the slot neck portions having different lengths and/or widths among the plurality of misplaced slots 41. Similarly, the regular slot 21 also has an inner end portion and an outer end portion, and the inner end portion and the outer end portion are respectively located on concentric circles having a third radius and a fourth radius from the center O of the stator 10. It can be understood that, the first radius, the second radius, the third radius and the fourth radius may all be different.

In addition, it can be understood that, in the three-phase electric machine shown in this embodiment, its winding mode makes each phase only include two slots, but it is also possible that each phase includes three slots or four slots based on different winding modes. In the case that each phase contains three slots, the ratio of closed slots to open slots can be 2:1 or 1:2. It can be understood that, when each phase contains four slots, the ratio of closed slots to open slots can be 3:1, 1:3 or 1:1. It can also be understood that, in the case that each phase contains more slots, based on the fact that each phase contains at least one regular slot 21 and one misplaced slot 41, there can also be more combination modes included in the protection scope claimed by the present disclosure.

After arranging according to the arrangement of the regular slot 21 and the misplaced slot 41 shown in any of the schemes 1-3 of Table 1 above, a good effect of reducing the torque ripple is obtained. After the experiment has been carried out with the electric machine at a torque of 235 Nm and a speed of 1000 rpm, the experimental data has showed that, using different schemes with regular slots and misplaced slots, scheme 1 to scheme 3 in the 24th-order torque ripple harmonic suppression effect experiment have obtained respectively the suppression effects of reducing the torque ripple by 16.35%, 8.25%, and 0.14% compared with the scheme in the prior art. Scheme 1 to scheme 3 in the 48th-order torque ripple harmonic suppression effect experiment have obtained respectively the suppression effects of reducing the torque ripple by 5.11%, 3.74%, and 2.23%. As such, the 24th-order and the 48th-order torque ripple harmonics have been significantly reduced, and a good technical effect has been achieved compared with the current arrangement of uniformly using regular slots.

Where it is technically possible, the technical features listed in relation to different embodiments can be combined with each other to form further embodiment within the scope of the present disclosure.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The term "including" is inclusive and has the same scope as "comprising".

The above-mentioned embodiments are possible examples of implementations of the present disclosure and are given only for the purpose of enabling those skilled in the art to clearly understand the principles of the invention. It should be understood by those skilled in the art that the above discussion to any embodiment is only illustrative, and is not intended to imply that the disclosed scope of the embodiments of the present disclosure (including claims) is limited to these examples; under the overall concept of the invention, the technical features in the above embodiments or different embodiments can be combined with each other to produce many other their variants in different aspects of embodiments of the invention that is not provided in detailed description for the sake of brevity. Therefore, any omission, modification, equivalent replacement, improvement, etc. made within the spirit and principle of the embodiment of the invention shall be included in the scope of protection claimed by the invention.

What is claimed is:

1. A stator for an electric machine, comprising:
a plurality of teeth defining a plurality of slots therebetween configured to accommodate windings, wherein, the plurality of slots extend radially between an inner circumference and an outer circumference of the stator, the plurality of slots including regular slots and misplaced slots, wherein, the regular slots include a first slot neck portion and a first filling portion and the misplaced slots include a second slot neck portion and a second filling portion, wherein the first slot neck portion and the second slot neck portion have different dimensions, and wherein the plurality of slots and associated windings establish at least two phases with at least one of the at least two phases including a regular slot and a misplaced slot, wherein the second slot neck portion has a first width in a circumferential direction of the inner circumference of the stator, the second filling portion has a second width in the circumferential direction of the inner circumference of the stator, and the first width is smaller than the second width.

2. The stator of claim 1 wherein, the at least two phases include a U-phase, a V-phase and a W-phase, the U-phase, the V-phase and the W-phase sequentially occupying the plurality of slots of the stator with slots corresponding to each of the U-phase, the V-phase, and the W-phase including one regular slot and one misplaced slot.

3. The stator of claim 2 wherein, in the U-phase, the V-phase and the W-phase, the regular slot and the misplaced slot are arranged alternately in sequence.

4. The stator of claim 2, wherein, in the U-phase, the V-phase and the W-phase, the regular slot and the misplaced slot are arranged in the following order: a U-phase regular slot, a U-phase misplaced slot, a V-phase regular slot, a V-phase misplaced slot, a W-phase misplaced slot and a W-phase regular slot.

5. The stator of claim 2 wherein, in the U-phase and the V-phase, the misplaced slot and the regular slot are arranged in sequence, and in the W-phase, the regular slot and the misplaced slot are arranged in sequence.

6. The stator of claim 1 wherein each of the at least two phases occupies three adjacent slots, and wherein the ratio of the number of the regular slots to the number of the misplaced slots in the three slots is either 2:1 or 1:2.

7. The stator of claim 1 wherein, the different dimension is length of the slot neck portion extending in a radial direction of the stator.

8. The stator of claim 1 wherein the first filling portion and the second filling portion have the same width and radial length, and wherein the first slot neck portion has a width and a radial length smaller than those of the second slot neck portion.

9. The stator of claim 1 wherein the first filling portion has a first inner end portion adjacent to the inner circumference and a first outer end portion adjacent to the outer circumference, and the first inner end portion and the first outer end portion are respectively located on concentric circles having a first radius and a second radius from a center of the stator.

10. The stator of claim 9 wherein the second filling portion has a second inner end portion adjacent to the inner circumference and a second outer end portion adjacent to the outer circumference, the second inner end portion and the second outer end portion are respectively located on concentric circles having a third radius and a fourth radius from the center of the stator, and the first radius, the second radius, the third radius, and the fourth radius are all different.

11. An electric machine having a stator surrounding a rotor with an air gap therebetween, the stator comprising:
a plurality of teeth defining a corresponding plurality of slots between adjacent teeth configured to accommodate windings, the plurality of slots each having a slot neck portion and a filling portion and extending radially between an inner circumference and an outer circumference of the stator, the plurality of slots including regular slots and misplaced slots, a slot neck portion of the misplaced slots having a dimension different from that of a slot neck portion of the regular slots, the plurality of slots and windings forming a plurality of phases, wherein each of the plurality of phases occupies at least two adjacent slots, the at least two adjacent slots including a regular slot and a misplaced slot.

12. The electric machine of claim 11 wherein, the plurality of slots and windings establish eight poles and three phases, the three phases including a U-phase, a V-phase, and a W-phase with each phase having at least one regular slot and at least one misplaced slot.

13. The electric machine of claim 12 wherein in the U-phase, the V-phase, and the W-phase, the regular slot and the misplaced slot are arranged alternately in sequence.

14. The electric machine of claim 11 wherein the dimension of the slot neck portion is width of the slot neck portion extending in a circumferential direction of the stator.

15. The electric machine of claim 11 wherein the regular slot includes a first filling portion and a first slot neck portion, the misplaced slot includes a second filling portion and a second slot neck portion, the first filling portion has a first inner end portion adjacent to the inner circumference and a first outer end portion adjacent to the outer circumference, the second filling portion has a second inner end portion adjacent to the inner circumference and a second outer end portion adjacent to the outer circumference, the first inner end portion and the first outer end portion are respectively located on concentric circles having a first radius and a second radius from a center of the stator, the second inner end portion and the second outer end portion are respectively located on concentric circles having a third radius and a fourth radius from the center of the stator, and the first radius, the second radius, the third radius, and the fourth radius are all different.

16. The electric machine of claim 15 wherein the second slot neck portion has a first width in a circumferential direction of the inner circumference of the stator, the second filling portion has a second width in the circumferential direction of the inner circumference of the stator, and the first width is smaller than the second width.

17. A method for reducing torque ripple of an electric machine, comprising:
providing a stator with an inner circumference adapted to surround a rotor;
disposing a plurality of stator slots accommodating windings radially between the inner circumference and an outer circumference of the stator, the plurality of stator slots each having a slot neck portion and a filling portion, the stator slots including regular slots and misplaced slots, the slot neck portion of the misplaced slot having a length different from that of the regular slot;
establishing a plurality of phases through the plurality of stator slots and a plurality of windings; and
making each of the plurality of phases occupy at least two adjacent slots, the at least two adjacent slots comprising a regular slot and a misplaced slot.

18. The method of claim 17 wherein the plurality of phases are a U-phase, a V-phase, and a W-phase each having at least one regular slot and at least one misplaced slot arranged alternately in sequence.

19. The method of claim 17 wherein, the regular slots include a first filling portion and a first slot neck portion, the misplaced slots include a second filling portion and a second slot neck portion, the first filling portion has a first inner end portion adjacent to the inner circumference and a first outer end portion adjacent to the outer circumference, the second filling portion has a second inner end portion adjacent to the inner circumference and a second outer end portion adjacent to the outer circumference, the first inner end portion and the first outer end portion are respectively located on concentric circles having a first radius and a second radius from a center of the stator, the second inner end portion and the second outer end portion are respectively located on concentric circles having a third radius and a fourth radius from the center of the stator, and the first radius, the second radius, the third radius, and the fourth radius are all different.

* * * * *